May 29, 1962     JIM Z. NISHIOKA     3,036,399
SINKER
Filed April 22, 1960
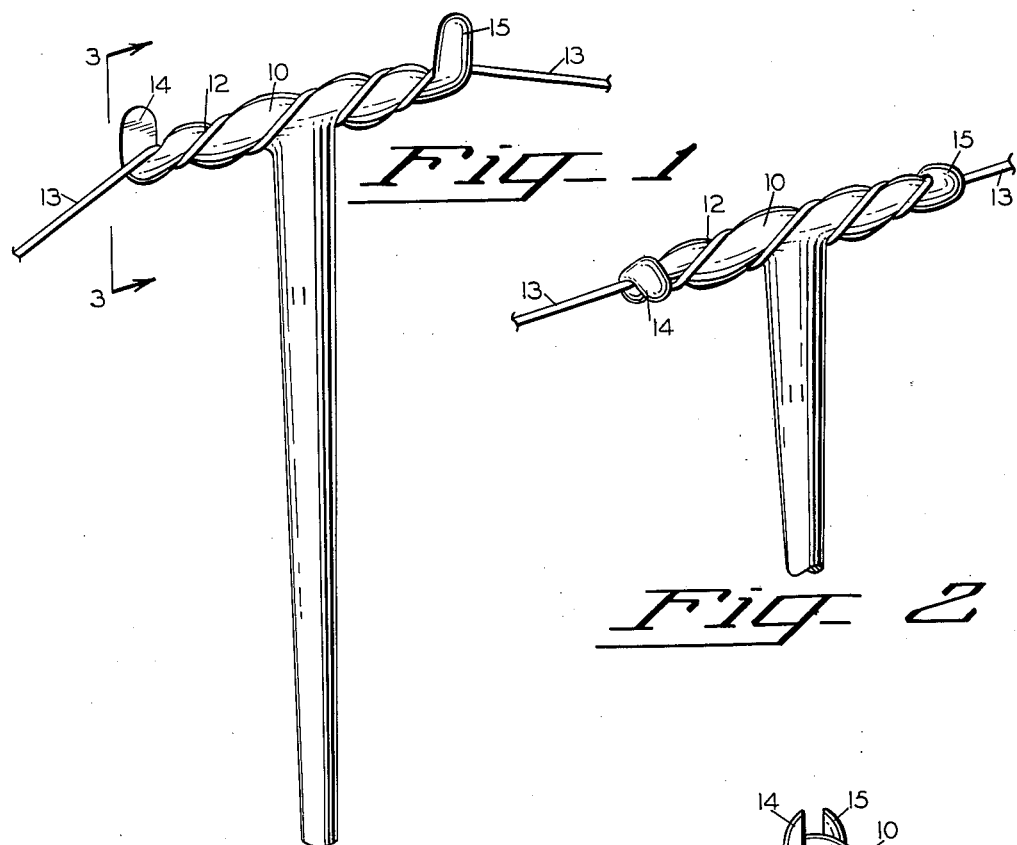
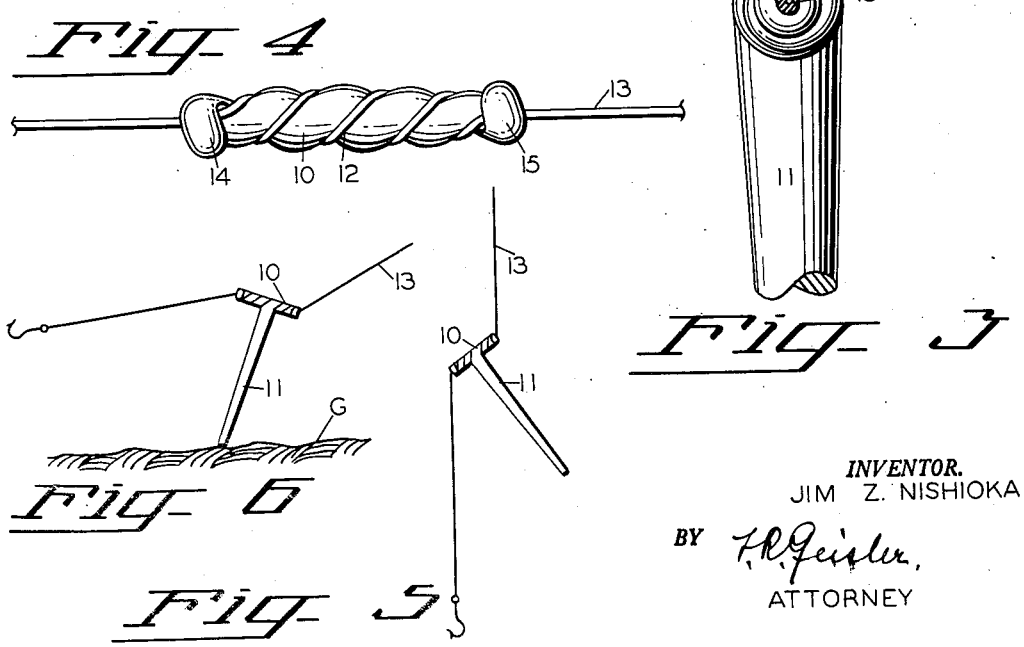
INVENTOR.
JIM Z. NISHIOKA
BY *F. R. Geisler*
ATTORNEY United States Patent Office 3,036,399
Patented May 29, 1962

3,036,399
SINKER
Jim Z. Nishioka, 1268 Hemlock St. NW., Salem, Oreg.
Filed Apr. 22, 1960, Ser. No. 24,057
2 Claims. (Cl. 43—44.89)

This invention relates in general to sinkers for fishing lines, and, more specifically, relates to sinkers of elongated shape and sinkers which can be adjustably positioned on the fishing line.

An object of the invention is to produce a sinker of novel shape and contour which can be quickly and easily installed at any desired point along the fishing line without any cutting or tying of the line.

A related object is to provide an improved sinker which can easily be removed from the line without cutting the line or which can similarly have its location changed on the line.

Another object of the invention is to provide an improved sinker the shape of which and the weight distribution in which will act to prevent the twisting of the line in use regardless of the tendency of the bait to rotate or roll.

A further object is to provide a sinker in which the shape and weight distribution will cause the sinker to hang at an angle with respect to the line during the casting of the line, thus reducing the possibility of becoming tangled with the line as the line is cast.

An additional object is to provide a sinker of novel shape and contour having no portions or attachments on which fish hooks could catch.

Another important object of the invention is to provide a simple practical and integral sinker which will aid in keeping the line and bait off the bottom of the river or other body of water, particularly during trolling.

The manner in which these objects and other advantages are achieved with this improved sinker will be apparent from the following brief description and explanation with reference to the accompanying drawings.

In the drawings:

FIG. 1 is an elevation of the sinker illustrating the first step in setting the sinker in place on the fishing line;

FIG. 2 is a similar elevation of the top portion of the sinker showing the next step of securing the sinker in the desired location on the line;

FIG. 3 is a fragmentary end elevation taken on line 3—3 of FIG. 1 and drawn to an enlarged scale;

FIG. 4 is a top plan view of the secured sinker shown in FIG. 2;

FIG. 5 is a small scale view illustrating the position which the sinker will assume on a freely suspended line; and FIG. 6 illustrates similarly the position assumed by the sinker as it is dragged on the bottom.

Referring to FIGS. 1 and 2, the sinker is made of suitable material, preferably lead, formed substantially into T-shape, having a top portion 10 and an integral elongated stem portion 11 extending down centrally from the top portion. Preferably the stem portion 11 is tapered downwardly as shown, and, in any case, the upper part of the stem 11 should be of greater thickness than the lower part to avoid any likelihood of the stem becoming broken off where it joins the top portion 10. The surface of the stem 11 is made round and smooth.

The top 10 of the sinker is formed with a continuing spiral groove 12 adapted to receive the fishing line 13. The bottom of this groove 12 is rounded or concave, and the surface contour of the top 10 in the intervening portions between the courses of the groove 12 is formed with convex curvatures so that the fishing line, when wound around over the top portion, will readily slip into place in the groove 12 upon being tightened. The rounded surface of the bottom of the groove 12 prevents any possibility of the fishing line being cut or worn as a result of its engagement with the groove throughout the top portion of the sinker.

The top portion 10 terminates at its ends in thin integral flexible ears 14 and 15 respectively, which, when the sinker has been placed in the desired location on the line, with the line passing along the groove 12 as shown in FIG. 1, are then folded down over the line as the line leaves the ends of the groove 12, the folded down ears being shown in FIGS. 2 and 4. Since the sinker is preferably made of lead these ears 14 and 15 are easily folded down merely by finger pressure, and, when thus folded down, prevent the line from leaving the groove 12 and also exert a slight clamping pressure on the line which clamping pressure, combined with the frictional engagement of the line with the groove, will hold the sinker against any slippage on the line.

Due to the comparative length and weight of the stem portion 11, the sinker tends to assume the position illustrated in FIG. 5 when the sinker is supported freely suspended on a vertically held line. It is apparent that in such position the sinker will not be readily rotated, and consequently when the line is held free, the sinker prevents the well known tendency of the line to twist in one direction or the other. In the casting of the line this relative position which the sinker normally assumes with respect to the line is an aid in preventing inadvertent tangling of the line. When the line is stretched out in oblique position, as in trolling, the sinker similarly acts to prevent any turning or twisting of the line.

Another important advantage of the sinker is the fact that it tends to keep the bait and hook off the bottom of the river or other body of water, as illustrated in FIG. 6, in which figure G indicates the bottom of the body of water.

The removal of the sinker from the fishing line is accomplished quickly and easily since all that is required is to bend the ears 14 and 15 up into open position and then to unwind the line from the top 10 of the sinker. The bending of the ears 14 and 15, either up or down, as previously indicated, can be done, without any difficulty, by the fingers, especially if the sinker is made of lead as preferred, and thus no tool is required for removing the sinker entirely or for changing it from one location to another on the line.

As is obvious, the entire sinker is designed to be formed cheaply by being molded from an integral mass of lead, or any other suitable material, with no added hooks or loops or other attachments of any sort being required. Consequently this improved sinker is capable of production at very low cost.

I claim:

1. An integral substantially T-shaped sinker comprising a top portion adapted to extend throughout its length along a fishing line and a step portion in the form of a solid bar of greater length than said top portion joining said top portion approximately at the longitudinal center part of said top portion and extending substantially perpendicular from said top portion, said top portion being formed with a spiral groove extending from one end of said top portion to the other, and adapted to receive a fishing line, and means at each end of said groove for securing the respective end of said top portion to the fishing line, whereby, when said sinker is mounted on the fishing line, said stem portion will hang down entirely away from the fishing line.

2. An integral substantially T-shaped sinker consisting of a top portion adapted to extend throughout its length along a fishing line and a stem portion comprising a solid bar of greater length than said top portion joining said top portion approximately at the longitudinal center of said top portion and extending substantially perpendicular from said top portion, said stem portion being round in cross section and having its greatest diameter at its junction with said top portion, said top portion being formed with a spiral groove extending from one end of said top portion to the other and adapted to receive the fishing line, and a flexible ear at each end of said groove for securing the respective end of said top portion to the fishing line, whereby, when said sinker is mounted on the fishing line, said stem portion will hang down entirely away from the fishing line.

References Cited in the file of this patent

UNITED STATES PATENTS

| | | |
|---|---|---|
| 399,866 | Gage | Mar. 19, 1889 |
| 1,802,260 | Kopsho | Apr. 21, 1931 |
| 2,517,375 | Anderson | Aug. 1, 1950 |
| 2,787,077 | Keiter | Apr. 2, 1957 |

FOREIGN PATENTS

| | | |
|---|---|---|
| 464 | Great Britain | Nov. 11, 1899 |
| 739,872 | Great Britain | Nov. 2, 1955 |
| 805,847 | Great Britain | Dec. 17, 1958 |